UNITED STATES PATENT OFFICE.

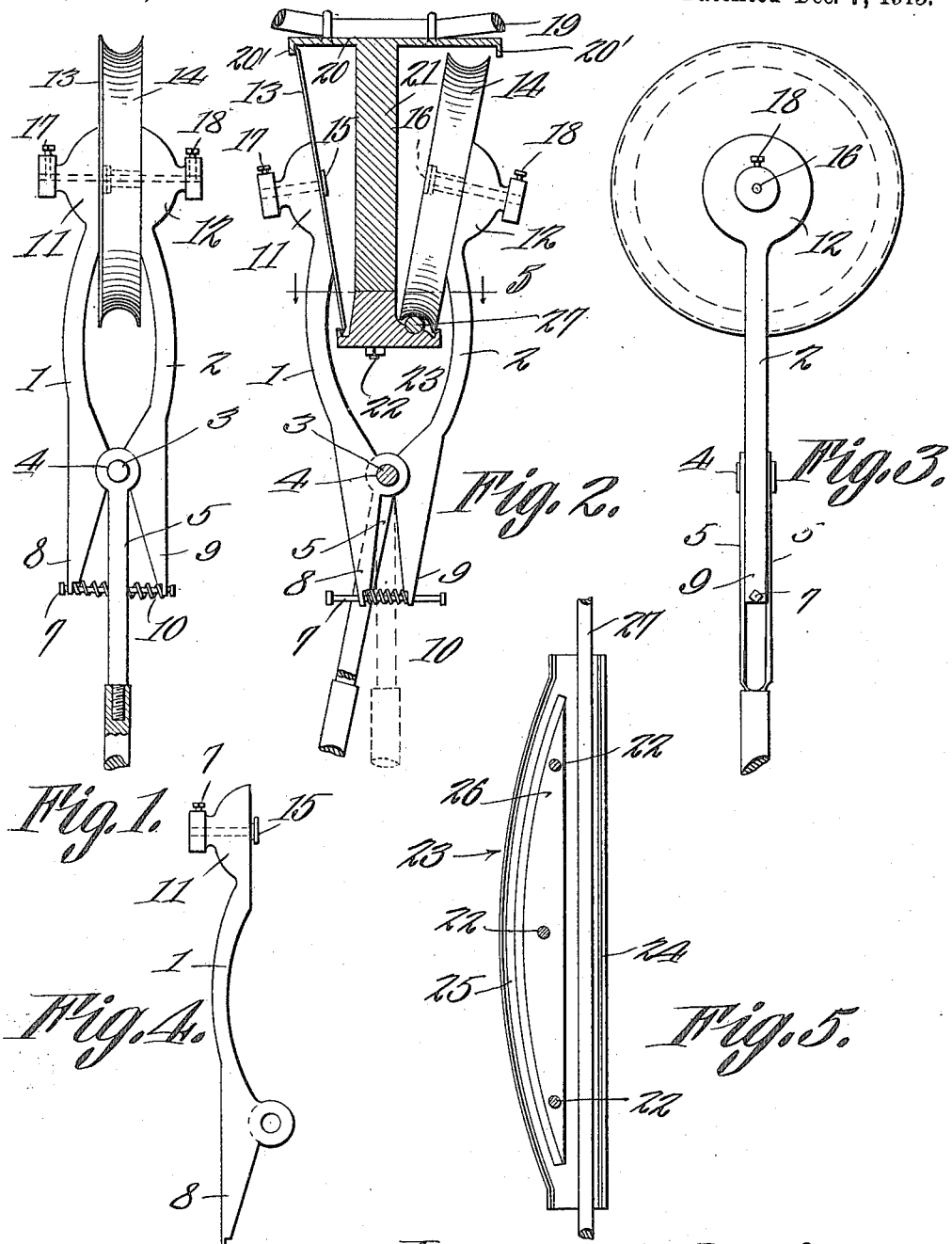

LORREMER DAVIS, OF BIRMINGHAM, ALABAMA.

TROLLEY.

1,162,984. Specification of Letters Patent. Patented Dec. 7, 1915.

Application filed February 24, 1915. Serial No. 10,317.

*To all whom it may concern:*

Be it known that I, LORREMER DAVIS, a citizen of the United States, residing at Birmingham, in the county of Jefferson and State of Alabama, have invented a new and useful Trolley, of which the following is a specification.

The present invention relates to improvements in trolleys, one object of the invention, being the provision of a separable trolley wheel for use with aerial cables and having means for normally holding the sections together in cable engaging position, and so constructed, that when passing a suspension wire, the sections separate to permit of the proper holding of the trolley upon the cable and in position.

The present invention is designed especially for enabling the trolley wheel which travels upon an aerial wire and which supports a weight therebelow, to readily pass the point of suspension of the aerial wire, although the device may be used with equal facility upon electric cars, in which event the device is carried by the upper end of the trolley pole with the trolley wheel riding upon the trolley wire and adapted to separate to pass upon opposite sides of the points of suspension. No matter how the device is used, the principles are the same.

A further object of the present invention, is the provision of a trolley of this character, which is simple and inexpensive in construction and readily manufactured and installed.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings, Figure 1 is an end view of the complete trolley showing the connection for attaching the same to a trolley pole. Fig. 2 is a similar view showing the sections of the trolley wheel separated by the suspension wire carrying device. Fig. 3 is a side elevation of the trolley with the trolley pole attachment. Fig. 4 is a detail view of one of the members of the trolley carrying portion. Fig. 5 is a top plan view of the switch for separating the sections of the trolley wheel.

Referring to the drawings, the trolley consists of the two members 1 and 2, which are held together by means of the bolt 3 at the hinged connection 4, for the two forked terminals 5 of the threaded stem 6 by means of which the present device supports any article to be suspended.

In order to normally hold the members 1 and 2 in the position, as shown in Fig. 1, the ends 8 and 9 respectively, are apertured for the reception of the limiting bolt or rod 7 which has disposed thereupon, the coiled spring 10 that normally holds the shorter ends of the members 1 and 2 outwardly or in the position, as shown in Fig. 1, the bolt or rod 7 being provided with heads at its opposite end to limit the outward movement of such ends as clearly illustrated.

The opposite ends of the members 1 and 2 are provided with the semi-spherical portions 11 and 12 respectively, and as each member is provided with its respective headed pin 15 or 16, the trolley wheel sections 13 and 14 are properly attached thereto to be carried by the members 11 and 12 so that the same may be positioned together, as shown in Fig. 1 or separated as shown in Fig. 2.

The headed pins 15 and 16 are held in place by means of the set screws 17 and 18.

It will thus be seen that the spring 10 normally holds the sections 13 and 14 together so as to constitute a grooved pulley or trolley wheel for proper assemblage upon or engagement with the trolley wire 27.

In order to provide a means for separating the sections automatically, due to the passage of the trolley wheel, there is attached to the suspension wire 19, the hooded plate 20 which is provided with the limiting flanges 20', such hooded plate being provided with the depending plate 21 which by means of the bolts 22 carries the shoe member 23. The plan view of the shoe member 23 is clearly illustrated in Fig. 5, the same being provided with the rims 24 and 25 to be engaged by the respective peripheries of the sections 14 and 13 of the trolley wheel, while the guiding or switch portion 26 thereof assumes the outline as shown in Fig. 5, and is the portion which abuts or is attached to the depending member 21 of the hood 20.

It will thus be seen that as the trolley approaches the shoe member 23, upon the wire 27, that the section 13 will be guided past upon one side of the guiding member 26 and have its periphery engage the rim or track 25 at the lower portion while at the upper portion, one of the flanges 20′ will limit the outward movement thereof, as clearly illustrated in Fig. 2, while the groove of the section 14 of the trolley wheel will be guided by the wire 27 and also the rim 24, in a straight line direction, the guide or flange 20′ of the hood at its side limiting the outward inclination of the section 14, all as clearly shown in Fig. 2.

As soon as the sections pass beyond the guiding member 26, the spring 10 will operate to cause the sections 13 and 14 to assume the position as shown in Fig. 1.

What is claimed is:

1. In a device of the character described, a pair of spring pressed separable members, and a trolley wheel composed of two sections carried by said members and normally held together thereby.

2. In a device of the character described, a pair of movable members, a trolley wheel composed of two sections carried by said members, and spring means connected to said members for normally holding the wheel sections together.

3. In a device of the character described, a pair of pivoted arms spring pressed to swing toward one another, and a trolley wheel composed of two sections carried by said arms and normally swung together thereby.

4. In a device of the character described, a pair of pivoted arms, a trolley wheel composed of two sections carried by said arms, and spring means connected to said arms for normally moving said wheel sections together.

5. In a device of the character described, a pair of arms, a pivotal element pivotally connecting them, a trolley wheel composed of two sections carried by the arms and adapted to fit snugly together, spring means between said arms for swinging the wheel sections together normally, and a member connected to said pivotal element.

6. The combination of a suspension member including a web having lower flanges at opposite sides, a cable supported by one of said flanges, a wheel adapted to travel on said cable and composed of two sections adapted to separate to move upon opposite sides of said web over the respective flanges, and suspending means including a pair of spring pressed members connected to the respective wheel sections and normally moving said wheel sections together.

7. The combination of a suspension member including a web having lower flanges at opposite sides, a cable supported by one of said flanges, a wheel adapted to travel on said cable and composed of two sections adapted to separate to move upon opposite sides of said web over the respective flanges, a suspension member, and a pair of spring pressed arms pivoted thereto below said cable and having their upper ends connected to said wheel sections to normally swing them together.

8. The combination of a suspension member including a web having lower flanges at opposite sides, a cable supported by one of said flanges, a wheel adapted to travel on said cable and composed of two sections adapted to separate to move upon opposite sides of said web over the respective flanges, a pair of upwardly projecting arms having their upper ends connected to the wheel sections, a pivotal element pivotally connecting said arms below said cable, a suspension member connected to said pivotal element, and spring means between said arms for normally swinging the wheel sections together.

In testimony that I claim the foregoing as my own, I have hereto affixed my signature in the presence of two witnesses.

LORREMER DAVIS.

Witnesses:
M. HANNING,
JAS. T. WALKER.

Copies of this patent may be obtained for five cents each, by addressing the "Commissioner of Patents, Washington, D. C."